United States Patent
Newton et al.

(10) Patent No.: US 7,959,127 B2
(45) Date of Patent: Jun. 14, 2011

(54) AXIAL TRIM FOR DIRTY SERVICE VALVE

(75) Inventors: Raymond R. Newton, Trabuco Canyon, CA (US); Paul A. Smirl, Dana Point, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 394 days.

(21) Appl. No.: 12/141,781

(22) Filed: Jun. 18, 2008

(65) Prior Publication Data
US 2009/0314974 A1 Dec. 24, 2009

(51) Int. Cl.
*F16K 47/00* (2006.01)
(52) U.S. Cl. ............ 251/127; 251/118; 137/625.37
(58) Field of Classification Search .......... 251/118, 251/122, 127; 137/625.3, 625.37
See application file for complete search history.

(56) References Cited

U.S. PATENT DOCUMENTS

| | | | | |
|---|---|---|---|---|
| 3,469,591 A | * | 9/1969 | Odendahl | 137/14 |
| 4,044,992 A | * | 8/1977 | Jukoff | 251/126 |
| 4,220,178 A | * | 9/1980 | Jackson | 137/625.3 |
| 4,327,757 A | | 5/1982 | Weevers | |
| 4,504,040 A | * | 3/1985 | Spils | 251/121 |
| 5,113,908 A | | 5/1992 | Steinke | |
| 6,003,551 A | * | 12/1999 | Wears | 137/625.33 |
| 6,076,552 A | | 6/2000 | Takahashi et al. | |
| 6,382,233 B1 | * | 5/2002 | Yandle, II | 137/68.23 |
| 7,055,548 B2 | | 6/2006 | Hamblin et al. | |
| 7,455,115 B2 | * | 11/2008 | Loretz et al. | 166/373 |
| 7,712,540 B2 | * | 5/2010 | Loretz et al. | 166/373 |

OTHER PUBLICATIONS

Written Opinion for PCT/US20008/088361.
Dresser, Inc. "Masoneilan 78400/18400 Series LincolnLog Control Valves," 2004.
Dresser, Inc. "Lincolnlog;" Competitive Selling Strategy—Masoneilan Products 1999.
Yarway Corporation. "Turbo-Cascade High Pressure Control Valve," Blue Bell, Pennsylvania, USA 1998.
Flowserve, Inc. "Valtek Channel Stream Control Valves," 1994.
Fisher Controls International, Inc. "Dirty Service Anti-Cavitation Trim (DST)" 1997.
Copes-Vulcan. Informational sheet on the CAV B9 trim.

* cited by examiner

*Primary Examiner* — John K Fristoe, Jr.
(74) *Attorney, Agent, or Firm* — Stetina Brunda Garred & Brucker (57) ABSTRACT

In accordance with the present invention, there is provided a dirty service valve including an axial trim which, as a result of its structural attributes and extended stroke length, provides increased Cv capacity relative to valve plug size in comparison to existing prior art designs. In accordance with one embodiment of the present invention, the axial trim integrated into the valve of the present invention is configured to provide a linear flow characteristic. In accordance with an alternative embodiment of the present invention, the axial trim may be configured to provide a non-linear flow characteristic which, coupled with the extended stroke length thereof, provides improved flow control in addition to increased Cv capacity. The axial trim possessing the above-described structural and functional attributes may also be integrated into an axial body or housing, thus making the use of rotary actuators in conjunction with the axial trim more feasible.

20 Claims, 5 Drawing Sheets

AXIAL TRIM FOR DIRTY SERVICE VALVE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Technical Field of the Invention

The present invention relates generally to flow control devices, and more particularly to a valve including an axial style trim which is adapted to facilitate a pressure drop along the axis of the trim and is well suited for use in conjunction with erosive fluids.

2. Description of the Related Art

As is known in the fluid flow control field, the control of erosive and cavitational forces is a primary objective of the design of many high pressure valves. There is currently known in the prior art valves which include shafts and plugs that are linearly displaced during normal operation of the valve. Within these valves, which are often referred to as linear displacement valves, the valve plug of the valve is disposed and moveable within a flow control element such as a disk stack or valve cage which defines a multiplicity of tortuous and non-tortuous fluid passages. Certain linear displacement valves are configured for "over plug flow" wherein fluid flows radially inward into the interior of the flow control element from the exterior thereof, with the fluid undergoing energy loss as a result of the flow radially inwardly through the flow control element. In this arrangement, the valve is opened by lifting the valve plug off a complimentary seat which thus allows the fluid to flow from the interior of the flow control element out of the valve via the unblocked valve seat. Conversely, the movement of the seating surface of the valve plug into sealed engagement with the complimentary seating surface of the valve seat facilitates a closed or shut-off condition for the valve.

Other linear displacement valves are configured for "under plug flow" wherein fluid flows radially outward from the interior of the flow control element to the exterior thereof, with the fluid also undergoing energy loss as a result of the flow radially outwardly through the flow control element. In this arrangement, the valve is opened by lifting the valve plug off a valve seat which thus allows fluid to flow into the interior of the flow control element via the unblocked valve seat. Conversely, the movement of the seating surface of the valve plug into sealed engagement with the complimentary seating surface of the valve seat facilitates a closed or shut-off condition for the valve.

Over plug flow and under plug flow linear displacement valves are sometimes employed in applications wherein an erosive fluid (e.g., water with abrasive sand) is channeled therethrough. The channeling of erosive fluids through linear displacement valves including flow control elements which comprise stacked disk designs or valve cage/cartridge designs gives rise to certain potential problems. More particularly, the potential problems lie in the susceptibility of the fluid passages defined by such disk stacks or valve cages becoming plugged by dirt or other debris in the fluid stream. In this regard, the blocking of the fluid passages of the flow control element with debris often causes a loss of both flow and control within the valve.

In recognition of these deficiencies, there has also been developed in the prior art high-pressure liquid letdown valves which are uniquely designed to operate reliably in harsh environments involving the flow of dirty liquids. These valves, often referred to as "dirty service" valves, typically include an axial trim which is adapted to facilitate a pressure drop along the axis of the trim, versus radial designs such as the disk stack and valve cage type trims discussed above. Since the axial trims are conducive to larger flow passages, they are better suited for use in conjunction with erosive fluids. One currently known variety of axial trim is a notch style trim such as that found in the 78400/18400 Series Masoneilan® LincolnLog® control valves provided by Dresser, Inc., and the Fisher® Notch Flow® control valves of Emerson Electric, Inc. Though these existing notch style axial trim valves are well suited for use with erosive fluids and provide high flow resistance, they possess certain deficiencies which detract from their overall utility.

One such deficiency relates to a lack of flow control. These control problems are attributable to the fact that currently known notch style axial trims possess a linear flow characteristic (i.e., Cv vs. axial trim stroke length). Another deficiency lies in the reduced Cv capacity of currently known notch style axial trims, such reduced capacity being attributable to their design coupled with the relatively short stroke length thereof within the valve. Additionally, axial trims, including the notch style axial trims discussed above, have not successfully been integrated into axial style bodies, and thus are not well suited for use in conjunction with rotary actuators.

The present invention effectively overcomes many of the deficiencies of prior art axial trims, including notch style axial trims, by providing a dirty service valve including an axial trim which has an extended stroke linear flow characteristic and, as a result, increased Cv capacity relative to valve plug size. Further, the axial trim integrated into the valve of the present invention may be configured to have a non-linear flow characteristic which, coupled with the extended stroke length thereof, provides improved flow control in addition to increased Cv capacity. The valve of the present invention may also include an axial body or housing which accommodates the axial trim, and possesses the advantages of being much lighter in comparison to bodies used in radial trim valves, with the axial body also making the use of rotary actuators more feasible. The use of rotary actuation reduces costs, and also provides advantages in relation to fugitive emissions. These, as well as other features and advantages of the present invention, will be discussed in more detail below.

BRIEF SUMMARY OF THE INVENTION

In accordance with the present invention, there is provided a dirty service valve including an axial trim which, as a result of its structural attributes and extended stroke length, provides increased Cv capacity relative to valve plug size in comparison to existing prior art designs. In accordance with one embodiment of the present invention, the axial trim integrated into the valve of the present invention is configured to provide a linear flow characteristic. In accordance with an alternative embodiment of the present invention, the axial trim may be configured to provide a non-linear flow characteristic which, coupled with the extended stroke length thereof, provides improved flow control in addition to increased Cv capacity. The axial trim possessing the above-described structural and functional attributes may also be integrated into an axial body or housing, thus making the use of rotary actuators in conjunction with the axial trim more feasible.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1:
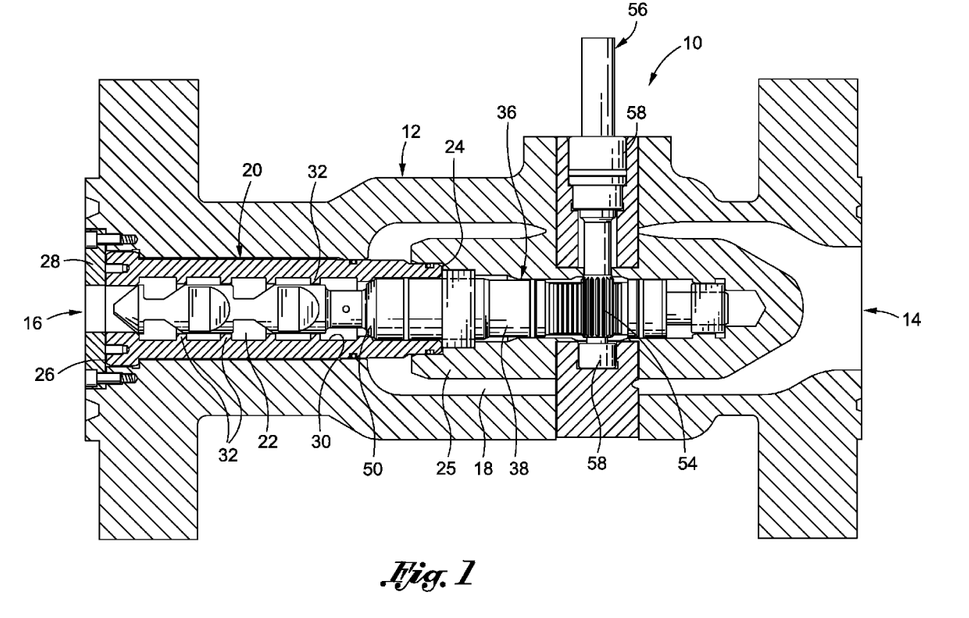
FIG. 1 is a partial cross-sectional view of an axial trim valve constructed in accordance with a first embodiment of the present invention, illustrating the axial trim of the valve in a closed position.
Figure 2:
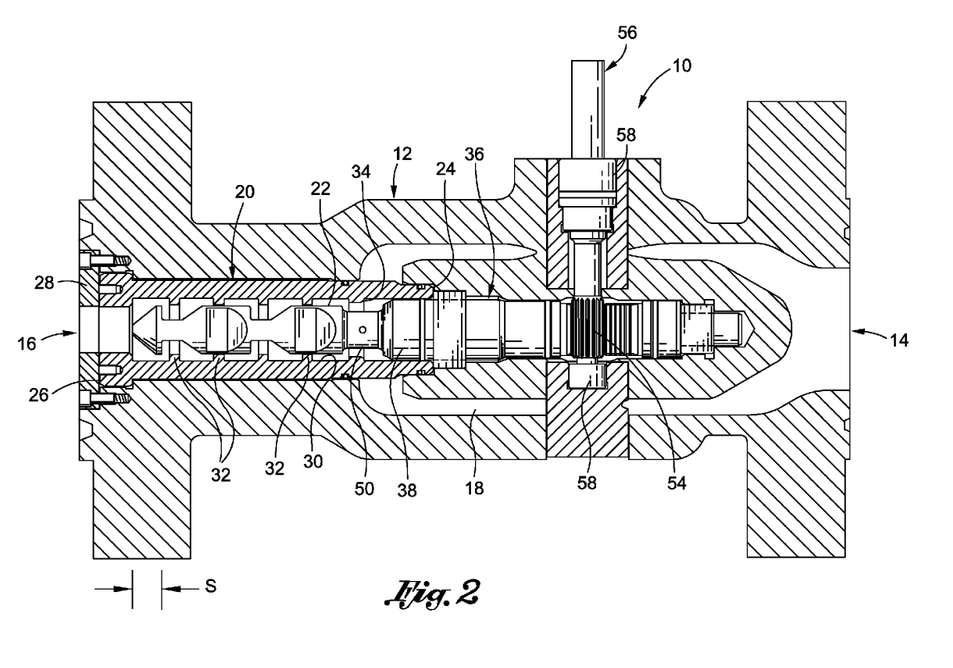
FIG. 2 is a partial cross-sectional view of the axial trim valve shown in FIG. 1, illustrating the axial trim of the valve in an open position.

Referring now to the drawings wherein the showings are for purposes of illustrating preferred embodiments of the present invention only, and not for purposes of limiting the same, FIGS. 1 and 2 depict an axial trim valve 10 constructed in accordance with a first embodiment of the present invention. As will be discussed in more detail below, the axial trim valve 10 is specifically suited for use in relation to "dirty service" applications wherein a dirty or erosive fluid is channeled therethrough.

The valve 10 comprises a housing 12 which defines a fluid inlet 14 and a fluid outlet 16. The fluid inlet 14 fluidly communicates with an inlet passage 18 which is defined by the housing 12. Disposed within the housing 12 is a generally cylindrical, tubular valve cage 20 which defines an outlet passage 22 fluidly communicating with the fluid outlet 16. The inlet passage 18 fluidly communicates with the outlet passage 22 via a plurality of openings 23 which are disposed within and extend circumferentially about the valve cage 20.

In the valve 10, the valve cage 20 defines a first rim or end 24 which is abutted against a complimentary shoulder defined by an internal hub portion 25 of the housing 12. The opposite, second rim or end 26 of the valve cage 20 is abutted against an annular retainer plate 28 which is itself rigidly secure to the housing 12. Thus, the valve cage 20 is effectively captured between the internal hub portion 25 of the housing 12 and the retainer plate 28.

Figure 6:
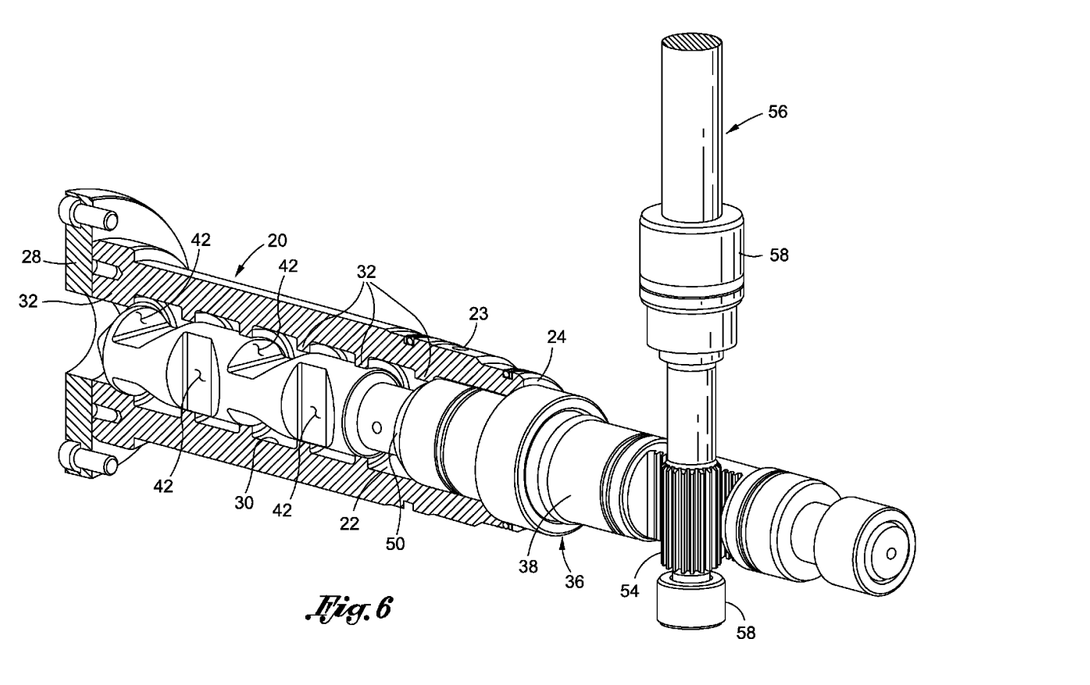
FIG. 6 is a perspective view of the axial trim shown in FIG. 3, further depicting the cooperative engagement thereof to a rotary actuator.

As best seen in FIG. 6, the valve cage 20 defines an inner surface 30 and a plurality of annular projection walls 32 which extend radially inward from the inner surface 30. As shown in FIGS. 1, 2 and 6, the valve cage 20 defines six (6) projection walls 32 which are separated from each other by substantially equally spaced increments. However, those of ordinary skill in the art will recognize that the number of and spatial separation between the projection walls 32 of the valve cage 20 may vary depending upon the structural characteristics of other elements of the valve 10 which will be described in more detail below. In the valve shown in FIGS. 1 and 2, the projection wall 32 disposed closest to the first end 24 of the valve cage 20 defines an annular seating surface 34. The above-described flow openings 23 which facilitate the fluid communication between the inlet passage 18 and the outlet passage 22 extend through that portion of the valve cage 20 disposed between the first end 24 and that projection wall 32 disposed closest to the first end 24 and defining the seating surface 34. The use of the projection walls 32 will also be described in more detail below.

Figure 3:
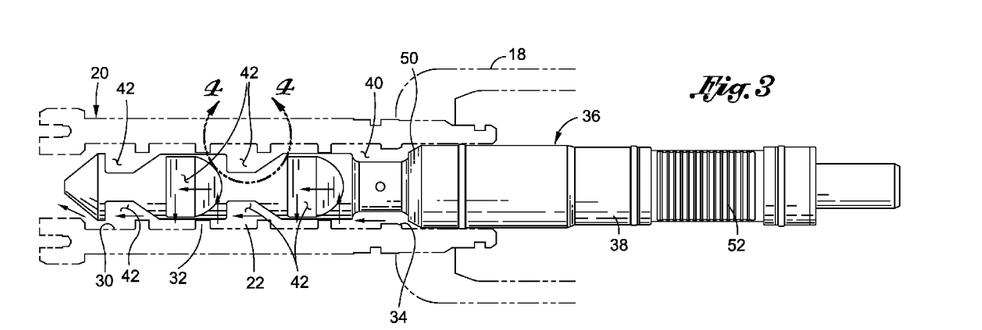
FIG. 3 is a side-elevational view of the axial trim of the valve shown in FIGS. 1 and 2.
Figure 4:
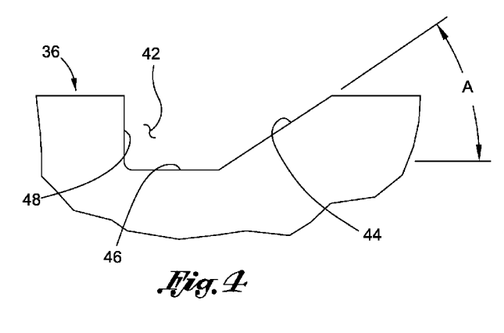
FIG. 4 is an enlargement of the encircled region 4 shown in FIG. 3.

The valve 10 of the present invention further comprises an elongate axial trim 36 which is shown in FIGS. 1-6, and is most clearly illustrated in FIGS. 3 and 6. The axial trim 36 defines a generally cylindrical main body 38. About one half of the length of the main body 38 normally resides within the interior of the valve cage 20, with the remaining half of the main body 38 normally residing within the interior of the internal hub portion 25 of the housing 12. That portion of the main body 38 normally residing within the interior of the valve cage 20 includes a continuous, circumferential groove or slot 40 formed therein. In addition to the slot 40, the portion of the main body 38 normally residing within the interior of the valve cage 20 includes four pairs of notches 42 disposed therein. The notches 42 of each pair are disposed in opposed relation to each other, and each have the surface configuration shown in FIG. 4. More particularly, each notch 42 is collectively defined by a sloped first wall 44 which transitions to a second wall 46 extending in generally parallel relation to the axis of the axial trim 36. As seen in FIG. 4, the first wall 44 extends at an angle A of approximately 32° relative to the second wall 46. This angle A represents a departure from prior art axial trim configurations wherein the wall of each notch thereof corresponding to the first wall 44 typically extends at either an angle of about 45° or about 60° relative to that wall corresponding to the second wall 46. In each notch 42, the second wall 46 itself transitions to a third wall 48 which extends generally perpendicularly relative to the axis of the axial trim 36.

In the valve 10, the axial trim 36 is reciprocally movable relative to the housing 12 and the valve cage 20 between a closed position (shown in FIG. 1) and an open position (shown in FIG. 2). In the axial trim 36, a portion of the main body 38 at one end of the slot 40 has a conical, tapered profile, and defines a seating surface 50 which is complimentary to the seating surface 34 defined by the valve cage 20. When the axial trim 36 is in its closed position, the seating surface 50 is cooperatively engaged to the seating surface 34 in a manner facilitating a sealed engagement therebetween as effectively blocks the flow of fluid from the flow openings 23 into the slot 40 within the outlet passage 22. Conversely, when the axial trim 36 is actuated to its open position fluid is able to flow between the seating surfaces 34, 50, and through the outlet passage 22 into the fluid outlet 16. Thus, when viewed from the perspective shown in FIGS. 1 and 2, the axial trim 36 move from right to left (i.e., in the direction of fluid flow) to assume its closed or shut-off position.

When the axial trim 36 is actuated to its open position, fluid is able to flow from the inlet passage 18 and into the slot 40 via the flow openings 23. Once fluid enters the slot 40, it flows axially along the axial trim 36 toward the fluid outlet 16. During such axial flow, the structural attributes of the projecting walls 32 and the notches 42, coupled with the spatial relationships of the projection walls 32 and notches 42 relative to each other as occurs when the axial trim 36 is in its open position, causes the flowing fluid to undergo a series of turns as it travels axially toward the fluid outlet 16, as characterized by the arrows shown in FIG. 3. More particularly, the impingement of the flowing fluid against the projection walls 32 of the valve cage 20 directs the fluid flow circumferentially about the axial trim 36 and into each of the opposed notches 42 of a corresponding pair thereof. Once reaching a pair of the notches 42, the fluid is flows axially along the axial trim 36 through a tortuous fluid path collectively defined by the pair of notches 42 and corresponding projection wall 32. After flowing out of each notch 42, the fluid may impinge the next downstream projection wall 32, with the flow pattern described above being repeated for the next opposed pair of notches 42. After flowing out of the opposed pair of notches 42 disposed closest to the second end 26 of the valve cage 20, the fluid simply flows into the fluid outlet 16. The number of turns the fluid flowing axially along the axial trim 36 undergoes as it flows between the seating surfaces 34, 50, into the slot 40, and through the outlet passage 22, is typically referred to as "stages." The axial trim 36 shown in FIGS. 1-6 is a five-stage version. However, the axial trim 36 may be fabricated to include a differing number of stages (e.g., a three-stage version). As will be recognized by those of ordinary skill in the art, the number and arrangement of projection walls 32 in the valve cage 20 is dependent upon the number of stages included in the axial trim 36.

In the valve 10, the tortuous flow path effectuated by the combination of the projection walls 32 and notches 42 when the axial trim 32 is actuated to its open position effectively dissipates the energy of the fluid flowing through the outlet passage 22 into the fluid outlet 16. Though effectively dissipating the fluid energy, the size or dimensions of the tortuous fluid path makes it less susceptible to clogging as a result of any debris included in the flowing fluid, thus making the combination of the axial trim 36 and the valve cage 20 particularly well suited for use in relation to erosive fluids or "dirty fluids."

As shown in FIG. 2, the stroke S of the axial trim 36 corresponds to the length of movement of the axial trim 36 between its open and closed positions. In the valve 10, the stroke S of the axial trim 36 is preferably in the range of from about ½ inch to about 2 inches. This stroke length is substantially increased in comparison to prior art valves including axial trims wherein the normal stroke length for the axial trim is about ¼ inch to about 1 inch. The increased stroke length S of the axial trim 36 of the valve 10 constructed in accordance with the present invention is attributable to the structural features of the axial trim 36, and more particularly the profile of each notch 42 as described above. In this regard, the specific structural attributes of each of the notches 42 as described above compels an increase in the stroke length S of the axial trim 36 to achieve the desired tortuous fluid flow path and corresponding fluid energy dissipation characteristics in relation to the flow of fluid through the outlet passage 22. Advantageously, this combination of the configuration of the notches 42 and the increased stroke length S effectively increases the Cv capacity of the valve 10 in comparison to existing prior art designs. In addition to increasing the Cv capacity, the extended stroke length S of the axial trim 36 within the valve 10 improves the controllability of the fluid flowing through the valve 10.

Figure 5:
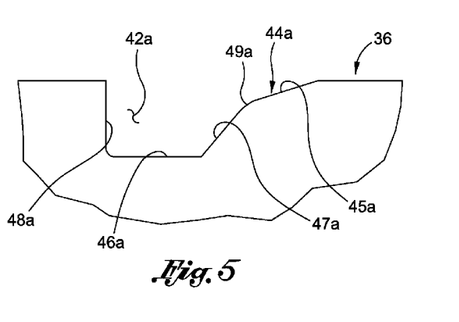
FIG. 5 is a partial cross-sectional view similar to FIG. 4, but depicting a potential variant of the notch design for the axial trim shown in FIG. 3.

Referring now to FIG. 5, it is contemplated that each notch 42 of the axial trim 36 may be substituted with an alternatively configured notch 42a. The sole distinction between the notches 42, 42a lies in the configuration of the first wall 44a of the notch 42a in comparison to the first wall 44 of the notch 42. More particularly, in the notch 42a, the first wall 44a has a first segment 45a and a second segment 47a which are separated from each other by an arcuate, convex third segment 49a. The second segment 47a transitions into the second wall 46a which is identical to the second wall 46. The second wall 46a itself transitions into the third wall 48a which is identical to the third wall 48. If the modified notches 42a are included in the axial trim 36, the resultant flow of fluid imparts the valve 10 with a non-linear flow characteristic, in comparison to the linear flow characteristic which arises from the use of the notches 42 described above. This non-linear flow characteristic, coupled with the extended stroke length of the axial trim 36 including the notches 42a, provides improved flow control in addition to increased Cv capacity in comparison to existing prior art designs. Those of ordinary skill in the art will recognize that the aforementioned non-linear flow characteristic may be achieved through the use of alternative configurations for the first wall 44a. For example, the first wall 44a may be modified so as to have an arcuate, convex configuration in its entirety, as opposed to defining the first and second segments 45a, 47a separated by the convex segment 49a. It is further contemplated that the axial trim 36 may be configured such that one or more sets of the notches 42 included therein are dissimilarly configured to the remaining set(s) of notches 42. By way of example and not by way of limitation, the axial trim 36 may be configured to include one or more pairs of the notches 42 in combination with one or more pairs of the notches 42a.

As seen in FIGS. 1-3 and 6, that portion of the main body 38 normally residing within the interior of the internal hub portion 25 of the housing 12 includes a rack portion 52 formed therein. Cooperatively engaged to the rack portion 52 is the spline portion 54 of an elongate, rotary drive shaft 56. The drive shaft 56 is advanced through a complimentary opening disposed within the housing 12. Additionally, sections of the drive shaft 56, including the distal portion thereof disclosed closest to the spline portion 54, are rotatably mounted within complimentary bearings 58 which are also disposed within the housing 12. As will be recognized by those of ordinary skill in the art, due to the meshed engagement between the spline portion 54 of the drive shaft 56 and the rack portion 52 of the axial trim 36, the rotation of the drive shaft 56 in clockwise and counter-clockwise directions facilitates the movement of the axial trim 34 between its closed and fully open positions. The rotation of the drive shaft 56 in either the clockwise or counter-clockwise directions as needed to facilitate the movement of the axial trim 36 between its closed and fully opened positions may be effectuated by a rotary actuation device (not shown) which is cooperatively engaged to that end of the drive shaft 56 disposed furthest from the spline portion 54 thereof. As indicated above, the use of rotary actuation reduces costs, and also provides advantages in relation to fugitive emissions.

As is most apparent from FIGS. 1 and 2, the housing 12 of the valve 10 is axially configured, that is to say, the fluid flows in a generally axial path from the fluid inlet 14 to the fluid outlet 16, despite the turns or "stages" created by the interaction between the axial trim 36 and the complimentary valve cage 20. The axial configuration of the housing 12 represents a departure from prior art axial trim valves wherein the axial trim is usually integrated into a non-axial valve body or housing which is typically of much greater size and weight, and thus of increased comparative cost. The axial housing 12 included in the valve 10 also allows for the optional inclusion of the rotary actuation described above. However, those of ordinary skill in the art will recognize that the valve cage 20 and corresponding axial trim 36 possessing the structural and functional attributes discussed above may be integrated into a non-axial valve body without departing from the spirit and scope of the present invention.

Figure 7:
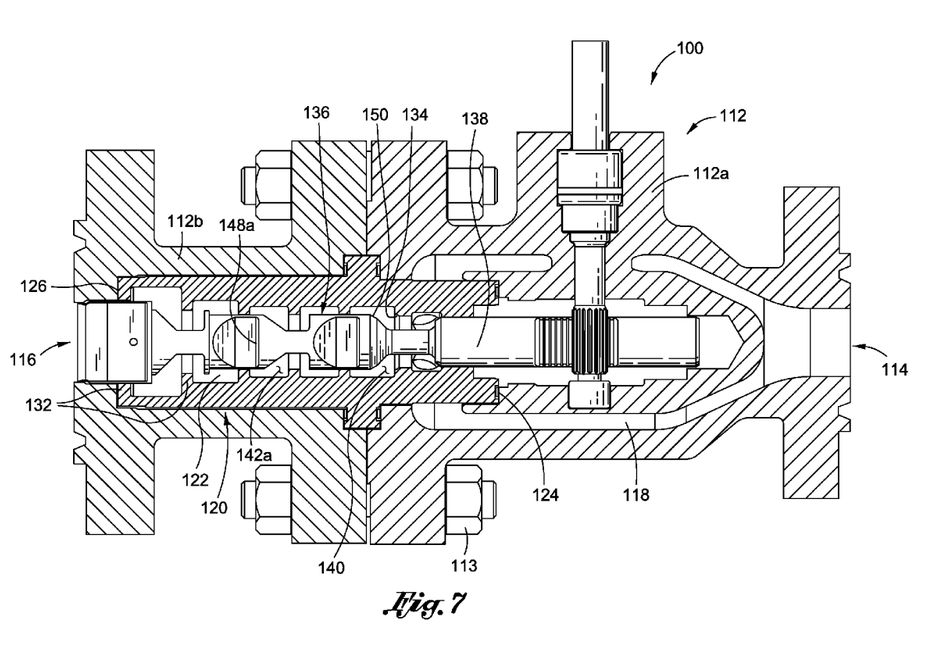
FIG. 7 is a cross-sectional view of a dirty service axial trim valve constructed in accordance with a second embodiment of the present invention.

Referring now to FIG. 7, there is shown a valve 100 constructed in accordance with a second embodiment of the present invention. The valve 100 of the second embodiment is similar in structure and function to the above-described valve 10, with only the distinctions between the valves 10, 100 being highlighted below. In FIG. 7, the one hundred series reference numbers correspond to respective ones of the ten series reference numbers included in FIGS. 1-6.

Like the valve 10, the valve 100 includes a housing 112 which also has an axial configuration. However, in contrast to the housing 12 described above which has a one-piece construction, the housing 112 has a two-piece construction including an inlet section 112a and an outlet section 112b. The inlet section 112a defines the fluid inlet 114 and the inlet passage 118. The outlet section 112b defines the fluid outlet 116 and accommodates the majority of the valve cage 120 of the valve 100. In the housing 112, the inlet and outlet sections 112a, 112b thereof are secured to each other via fasteners 113 such as bolts.

In the valve 100, the axial trim 136 is reciprocally movable relative to the housing 112 and the valve cage 120 between a closed position and an open position (shown in FIG. 7). In the axial trim 136, a portion of the main body 138 at one end of the slot 140 has a conical, tapered profile, and defines a seating surface 150 which is complimentary to the seating surface 134 defined by the valve cage 120. When the axial trim 136 is in its closed position, the seating surface 150 is cooperatively engaged to the seating surface 134 in a manner facilitating a sealed engagement therebetween as effectively blocks the flow of fluid through the outlet passage 122. Conversely, when the axial trim 136 is actuated to its open position fluid is able to flow between the seating surfaces 134, 150, and through the outlet passage 122 into the fluid outlet 116. Thus, when viewed from the perspective shown in FIG. 7, the axial trim 136 move from left to right (i.e., in a direction opposite to the fluid flow) to assume its closed or shut-off position. As such, in comparison to the valve 10, the valve 100 is "up seated", with the flow of the fluid through each of the notches 142 of the axial trim 136 initially occurring over the third wall 148a thereof, in contrast to the valve 10 wherein the flow of the fluid through each of the notches 42 of the axial trim 36 initially occurring over the first wall 44 thereof.

With further regard to the valve cage 120 of the valve 100, such valve cage 120 is configured to provide late stage area expansion as the fluid flows axially through the outlet passage 122 of the valve cage 120 toward the fluid outlet 116. More particularly, in the valve cage 120, portions of the inner surface 130 thereof are of progressively increasing diameter as the inner surface 130 approaches the second end 126. Similarly, certain ones of the projection walls 132 are of gradually increasing inner diameter as they approach the second end 126 of the valve cage 120, and hence the fluid outlet.

Additionally, with regard to the axial trim 136 of the valve 100, portions thereof are of progressively increasing diameter as the axial trim 136 approaches the fluid outlet 116. More particularly, the distal portion of the main body 138 of the axial trim disposed closest to the second end 126 of the valve cage 120 has a generally cylindrical, plug-like configuration which is of a first diameter. The distal portion transitions into a section of the main body 138 which has the notches 142a disposed closest to the distal portion formed therein, and is of a second diameter which is less than the first diameter. The remaining sets of notches 142a are formed in a section of the main body 138 which is of a third diameter less than the second diameter, as is apparent from FIG. 7. The late stage expansion effectuated by the structural attributes of the valve cage 120 and axial trim 136 as highlighted above is well suited for hot expansion applications, with the higher expansion ratio provided thereby effectuating lower discharge velocities through the fluid outlet 116 of the valve 100.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A valve for regulating the flow of a fluid, the valve comprising:
   a housing defining a fluid inlet and a fluid outlet;
   a valve cage disposed within the housing and defining at least one projection wall;
   an axial trim at least partially disposed within the valve cage and reciprocally moveable between an open position wherein. fluid is able to flow therealong from the fluid inlet to the fluid outlet, and a closed position wherein the flow of the fluid from the fluid inlet to the fluid outlet is blocked thereby, the axial trim comprising:
   an elongate main body defining an axis; and
   at least one opposed pair of notches formed in the main body, each of the notches of the pair defining a first wall which extends at an angle in the range of from about 20° to about 40° relative to the axis, a second wall which. extends to the first wall in generally parallel relation to the axis; and a third wall which extends to the second wall in generally perpendicular relation to the axis;
   the axial trim being configured such that the first wall is disposed upstream from the third wall within each of the notches formed in the main body;
   the notches and the projection wall collectively defining a tortuous flow passage through the valve cage which fluidly connects the fluid inlet to the fluid outlet when the axial trim is in the open position.

2. The valve of claim 1 wherein the first wall extends at an angle of about 32° relative to the axis of the main body.

3. The valve of claim 1 wherein the axial. trim has a stroke length in the range of from about ½ inch to about 2 inches during movement between the open and closed positions.

4. The valve of claim 1 wherein:
   the valve cage defines at least four projection walls which are disposed in spaced relation to each other; and
   the axial trim includes al least four pairs of opposed notches;
   each of the projecting walls cooperating with a respective pair of the notches in a manner wherein the notches and the projection walls collectively define the tortuous flow passage when the axial trim is in the open position.

5. The valve of claim 4 wherein:
   the valve cage defines a series of inner surface sections, each of the inner surface sections extending between a corresponding pair of the wall projections; and
   at least some of the inner surface sections are of progressively increasing diameter as they advance from the fluid inlet toward the fluid outlet of the housing.

6. The valve of claim 5 wherein:
the main body of the axial trim has a distal portion disposed closest to the fluid outlet which is of a first diameter;
the distal portion transitions into a section of the main body which has at least one pair of the notches formed therein, and is of a second diameter which is less than the first diameter; and
the section of the main body which is of the second diameter transitions into a section of the main body which has at least one pair of the notches formed therein, and is of a third diameter which is less than the second diameter.

7. The valve of claim 1 wherein the housing of the valve is configured such that the flow of the fluid from the fluid inlet to the fluid outlet. occurs along a flow path which extends generally axially from the fluid inlet to the fluid outlet.

8. The valve of claim 7 wherein the main body of the axial trim further includes a rack portion formed therein and residing within the housing.

9. The valve claim 8 further comprising a drive shaft rotatably coupled to the housing and including a spline portion which. is cooperatively engaged to the rack portion such that the rotation of the drive in a first direction facilitates the movement of the axial trim to the open position, and the rotation of the drive in a second direction opposite the first direction facilitates the movement of the axial trim to the closed position.

10. The valve of claim 1 wherein the flow of the fluid through each of the notches when the axial trim is in the open position initially occurs over the first wall thereof.

11. The valve of claim 1 wherein the flow of the fluid through each of the notches when the axial trim is in the open position initially occurs over the third wall thereof.

12. A valve for regulating the flow of a fluid, the valve comprising:
a housing defining a fluid inlet and a fluid outlet;
a valve cage disposed within the housing and defining at least one projection wall;
an axial trim at least partially disposed within the valve cage and reciprocally moveable between-an open position wherein fluid is able to flow therealong from the fluid inlet to the fluid outlet, and a closed position wherein the flow of the fluid from the fluid inlet to the fluid outlet is blocked thereby, the axial trim comprising:
an elongate main body defining an axis; and
at least one opposed pair of notches formed in the main body, each of the notches of the pair defining a first wall which extends angularly relative to the axis, a second wall which extends to the first wall in generally parallel relation to the axis, and a third wall which extends to the second wall in generally perpendicular relation to the axis, the first wall defining a first segment and a second segment which are separated from each other by an arcuate, convex third segment;
the axial trim being configured such that the first wall is disposed upstream from the third wall within each of the notches formed in the main body:
the notches and the projection wall collectively defining a tortuous flow passage through the valve cage which fluidly connects the fluid inlet to the fluid outlet when the axial trim is in the open position.

13. The valve of claim 12 wherein the axial. trim has a stroke length in the range of from about ½ inch to about 2 inches during movement between the open and closed positions.

14. The valve of claim 12 wherein:
the valve cage defines at least four projection walls which are disposed in spaced relation to each other; and
the axial trim includes at least four pairs of opposed notches;
each of the projecting walls cooperating with a respective pair of the notches in a manner wherein the notches and the projection wails collectively define the tortuous flow passage when the axial trim is in the open position.

15. The valve of claim 14 wherein:
the valve cage defines a series of inner surface sections, each of the inner surface sections extending between a corresponding pair of the wall projections; and
at least some of the inner surface sections are of progressively increasing diameter as they advance from the fluid inlet toward the fluid outlet of the housing.

16. The valve of claim 12 wherein the housing of the valve is configured such that the flow of the fluid from the fluid inlet to the fluid outlet occurs along a flow path which extends generally axially from the fluid inlet to the fluid outlet.

17. The valve of claim 16 wherein the main body of the axial trim further includes a rack portion formed therein and residing within the housing.

18. The valve of claim 17 further comprising a drive shaft rotatably coupled to the housing and including a spline portion which is cooperatively engaged to the rack portion such that the rotation of the drive in a first direction facilitates the movement of the axial trim to the open position, and the rotation of the drive in a second direction opposite the first direction facilitates the movement of the axial trim to the closed position.

19. A valve for regulating the flow or a fluid, the valve comprising:
a housing defining a fluid inlet and a fluid outlet;
an axial trim disposed within the housing and reciprocally moveable between an open position wherein fluid is able to flow therealong from the fluid inlet to the fluid outlet, and a closed position wherein the flow of the fluid from the fluid inlet to the fluid outlet is blocked thereby, the axial trim comprising:
an elongate main body defining an axis; and
at least one opposed pair of notches formed in the main body, each of the notches of the pair defining a first wall which extends at an angle in the range of from about 20° to about 40° relative to the axis, a second wall which extends to the first wall in generally parallel relation to the axis, and a third wall which extends to the second wall in generally perpendicular relation to the axis;
the axial trim being configured such that the first wall is disposed upstream from the third wall within each of the notches formed in the main body;
the notches partially defining a tortuous flow passage through the housing which fluidly connects the fluid inlet to the fluid outlet when the axial trim is in the open position.

20. The valve of claim 19 wherein the axial trim has a stroke length in the range of from about ½ inch to about 2 inches during movement between the open and closed positions.

* * * * *